US012237750B2

(12) United States Patent
Wu et al.

(10) Patent No.: US 12,237,750 B2
(45) Date of Patent: Feb. 25, 2025

(54) TERMINAL ASSEMBLY FOR ENCAPSULATED STATOR

(71) Applicant: SCHLUMBERGER TECHNOLOGY CORPORATION, Sugar Land, TX (US)

(72) Inventors: Jinbin Wu, Singapore (SG); Onkar Sunil Kulkarni, Pune (IN); Maksim Y. Radov, Singapore (SG); Varun Vinaykumar Nyayadhish, Nisku (CA); William K. Goertzen, Lawrence, KS (US); Jason Holzmueller, Lawrence, KS (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/697,639

(22) PCT Filed: Oct. 28, 2022

(86) PCT No.: PCT/US2022/048253
§ 371 (c)(1),
(2) Date: Apr. 1, 2024

(87) PCT Pub. No.: WO2023/076618
PCT Pub. Date: May 4, 2023

(65) Prior Publication Data
US 2024/0266907 A1 Aug. 8, 2024

(30) Foreign Application Priority Data

Oct. 28, 2021 (IN) .............................. 202121049297
Nov. 11, 2021 (IN) .............................. 202121051679

(51) Int. Cl.
 *H02K 5/22* (2006.01)
 *H02K 15/10* (2006.01)

(52) U.S. Cl.
 CPC ............. *H02K 5/225* (2013.01); *H02K 15/10* (2013.01); *H02K 2203/06* (2013.01)

(58) Field of Classification Search
 CPC ............ H02K 3/28; H02K 3/50; H02K 3/505; H02K 5/12; H02K 5/1285; H02K 5/132;
 (Continued)

(56) References Cited

U.S. PATENT DOCUMENTS 4,613,645 A * 9/1986 Robeson ............ C08G 65/4012
 524/611
4,833,354 A * 5/1989 Miller ...................... H02K 3/38
 310/260

(Continued)

FOREIGN PATENT DOCUMENTS

EP 2390965 A1 11/2011
JP 06141502 * 5/1994
 (Continued)

OTHER PUBLICATIONS

Lee, Machine Translation of KR20180006819, Jan. 2018 (Year: 2018).*

(Continued)

*Primary Examiner* — Eric Johnson
(74) *Attorney, Agent, or Firm* — Jeffrey D. Frantz

(57) ABSTRACT

A terminal assembly for an encapsulated stator is provided. The terminal assembly includes an elbow terminal and an insulating tube. The terminal assembly allows for joining of magnet wire and lead wire at a 90 degree angle. A terminal assembly for an ESP motor head is provided. The terminal assembly includes a terminal, an insulation tube, and a sleeve. The insulation tube is disposed in the motor head (Continued)

pothole. The terminal is disposed within the insulation tube. An end of the terminal configured to receive a lead wire includes internal threads. The threads allow for accommodation of various lengths of lead wires extending from the stator.

20 Claims, 12 Drawing Sheets

(58) Field of Classification Search
CPC ...... H02K 5/22; H02K 5/225; H02K 2203/06; H02K 2203/09; E21B 43/128
See application file for complete search history.

(56) References Cited

U.S. PATENT DOCUMENTS

| | | | | |
|---|---|---|---|---|
| 5,782,652 | A * | 7/1998 | Feher | H02K 11/40 439/417 |
| 6,020,661 | A * | 2/2000 | Trago | H02K 15/12 310/43 |
| 2003/0156954 | A1 * | 8/2003 | Kimura | H01R 13/6592 417/410.5 |
| 2009/0317997 | A1 | 12/2009 | Watson et al. | |
| 2017/0018989 | A1 * | 1/2017 | Reeves | F04C 15/008 |
| 2017/0141634 | A1 * | 5/2017 | Honda | H02K 3/522 |
| 2018/0131124 | A1 | 5/2018 | Matlack et al. | |

FOREIGN PATENT DOCUMENTS

| | | |
|---|---|---|
| KR | 1020180006819 A | 1/2018 |
| WO | 2016089938 A1 | 6/2016 |

OTHER PUBLICATIONS

Nishikawa, Machine Translation of JP06141502, May 1994 (Year: 1994).*

International Search Report and Written Opinion issued in International Patent Appl. No. PCT/US2022/048253 on Feb. 28, 2023; 11 pages.

* cited by examiner

TERMINAL ASSEMBLY FOR ENCAPSULATED STATOR

CROSS-REFERENCE TO RELATED APPLICATIONS

The present application is a National Stage Entry of International Application No. PCT/US2022/048253, filed Oct. 28, 2022, which claims priority benefit of Indian Application Nos. 202121049297, filed Oct. 28, 2021, and 202121051679, filed Nov. 11, 2021, the entirety of each of which is incorporated by reference herein and should be considered part of this specification.

BACKGROUND

Field

The present disclosure generally relates to a terminal assembly, and more particularly to a terminal assembly for encapsulated stators.

Description of the Related Art

Various types of artificial lift equipment and methods are available, for example, electric submersible pumps (ESPs). An ESP includes multiple centrifugal pump stages mounted in series, each stage including a rotating impeller and a stationary diffuser mounted on a shaft, which is coupled to a motor. In use, the motor rotates the shaft, which in turn rotates the impellers within the diffusers. Well fluid flows into the lowest stage and passes through the first impeller, which centrifuges the fluid radially outward such that the fluid gains energy in the form of velocity. Upon exiting the impeller, the fluid flows into the associated diffuser, where fluid velocity is converted to pressure. As the fluid moves through the pump stages, the fluid incrementally gains pressure until the fluid has sufficient energy to travel to the well surface.

SUMMARY

In some configurations, a terminal assembly for a stator includes an elbow terminal comprising a first arm and a second arm disposed at 90 degrees relative to the first arm, the first arm configured to be connected to a lead wire and the second arm configured to be connected to a magnet wire; and an insulating tube, wherein the first arm of the elbow terminal extends within the insulating tube and the second arm of the elbow terminal protrudes from the insulating tube.

The terminal assembly can include an o-ring disposed radially between the first arm and an inner surface of the insulating tube. The terminal assembly can include a terminal nut disposed radially between the first arm and an inner surface of the insulating tube, the terminal nut configured to secure the elbow terminal within the insulating tube. The terminal assembly can include a snap ring disposed on an outer surface of the insulating tube, the snap ring configured to secure the terminal assembly in encapsulation tooling. The insulating tube can be made of a structural dielectric material based on poly aryl ether ketone chemistry.

In some configurations, a method of assembling a terminal assembly for a stator includes connecting a magnet wire to a first arm of an elbow terminal; disposing an insulating tube about a second arm of the elbow terminal, the second arm disposed at a 90 degree angle relative to the first arm; securing the insulating tube in encapsulation tooling; pouring encapsulant material through the encapsulation tooling into the stator.

The method can further include connecting a lead wire to the second arm of the elbow terminal.

In some configurations, a terminal assembly for an ESP motor head includes an insulation tube; a terminal disposed within the insulation tube, a first end of the terminal configured to receive a lead wire extending from a stator of the ESP; and a sleeve disposed radially between the lead wire and the insulation tube.

The first end of the terminal can include internal threads configured to allow for accommodation of varying lengths of the lead wire extending from the stator. The sleeve can be configured to centralize the lead wire and/or the terminal within the insulation tube. The sleeve can be made of or include a structural dielectric material. The insulation tube can be made of a structural dielectric material based on poly aryl ether ketone chemistry. The sleeve can have a chamfered leading or uphole end of portion. An opposite end of the terminal can be configured to receive a male terminal of a pothead connector configured to be coupled to the motor head.

In some configurations, a stator for an electric submersible pump motor includes a housing; a plurality of laminations forming a lamination stack within the housing; slots extending axially through the lamination stack; windings extending axially through the slots; an end turn area at a top end of the lamination stack in which the windings extend generally circumferentially; encapsulation material surrounding the windings in the end turn area; and a plurality of lead wires coupled to the windings and extending upward from the end turn area. Each lead wire includes a solid copper conductor and a structural dielectric material insulation extruded about the conductor. The stator includes a stator terminal assembly coupling each lead wire of the plurality of lead wires to one or more magnet wires of the windings. The stator terminal assembly includes an elbow terminal comprising a first arm and a second arm disposed at 90 degrees relative to the first arm, the first arm configured to be connected to the lead wire and the second arm configured to be connected to the one or more magnet wires; and an insulating tube, wherein the first arm of the elbow terminal extends within the insulating tube and the second arm of the elbow terminal protrudes from the insulating tube.

An electric submersible pump motor can include the stator and a motor head comprising at least one pothole configured to receive a cable connector coupled to a cable. The motor can further include the cable connector and the cable, wherein the cable comprises a structural dielectric material based on poly aryl ether ketone chemistry. The motor can include a motor head terminal assembly disposed in the at least one pothole. The motor head terminal assembly includes an insulation tube; and a terminal disposed within the insulation tube, a first end of the terminal configured to receive the lead wire extending from the stator of the ESP. The first end of the terminal can include internal threads configured to allow for accommodation of varying lengths of the lead wire extending from the stator. An opposite second end of the terminal can be configured to receive a male terminal of the cable connector.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Figure 1:
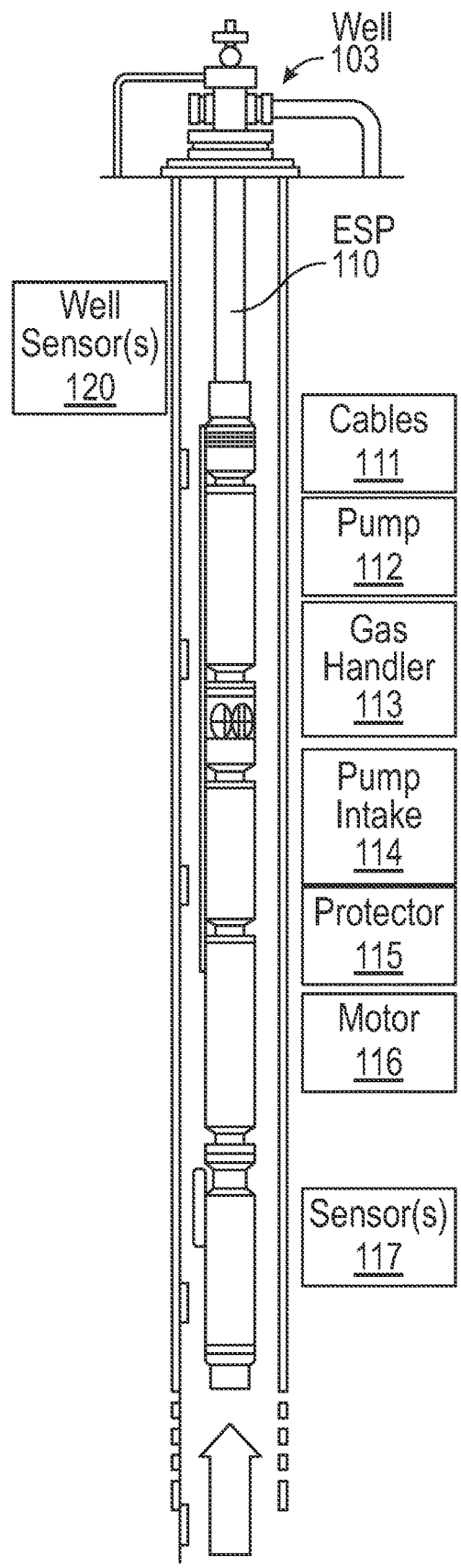
FIG. 1 shows a schematic of an electric submersible pump (ESP) system.

Various types of artificial lift equipment and methods are available, for example, electric submersible pumps (ESP). As shown in the example embodiment of FIG. 1, an ESP 110 typically includes a motor 116, a protector 115, a pump 112, a pump intake 114, and one or more cables 111, which can include an electric power cable. The motor 116 can be powered and controlled by a surface power supply and controller, respectively, via the cables 111. In some configurations, the ESP 110 also includes gas handling features 113 and/or one or more sensors 117 (e.g., for temperature, pressure, current leakage, vibration, etc.). As shown, the well may include one or more well sensors 120.

The pump 112 includes multiple centrifugal pump stages mounted in series within a housing. Each stage includes a rotating impeller and a stationary diffuser. A shaft extends through the pump (e.g., through central hubs or bores or the impellers and diffusers) and is operatively coupled to the motor 116. The shaft can be coupled to the protector 115 (e.g., a shaft of the protector), which in turn can be coupled to the motor 116 (e.g., a shaft of the motor). The impellers are rotationally coupled, e.g., keyed, to the shaft. The diffusers are coupled, e.g., rotationally fixed, to the housing. In use, the motor 116 causes rotation of the shaft (for example, by rotating the protector 115 shaft, which rotates the pump shaft), which in turn rotates the impellers relative to and within the stationary diffusers.

In use, well fluid flows into the first (lowest) stage of the ESP 110 and passes through an impeller, which centrifuges the fluid radially outward such that the fluid gains energy in the form of velocity. Upon exiting the impeller, the fluid makes a sharp turn to enter a diffuser, where the fluid's velocity is converted to pressure. The fluid then enters the next impeller and diffuser stage to repeat the process. As the fluid passes through the pump stages, the fluid incrementally gains pressure until the fluid has sufficient energy to travel to the well surface.

Figure 2:
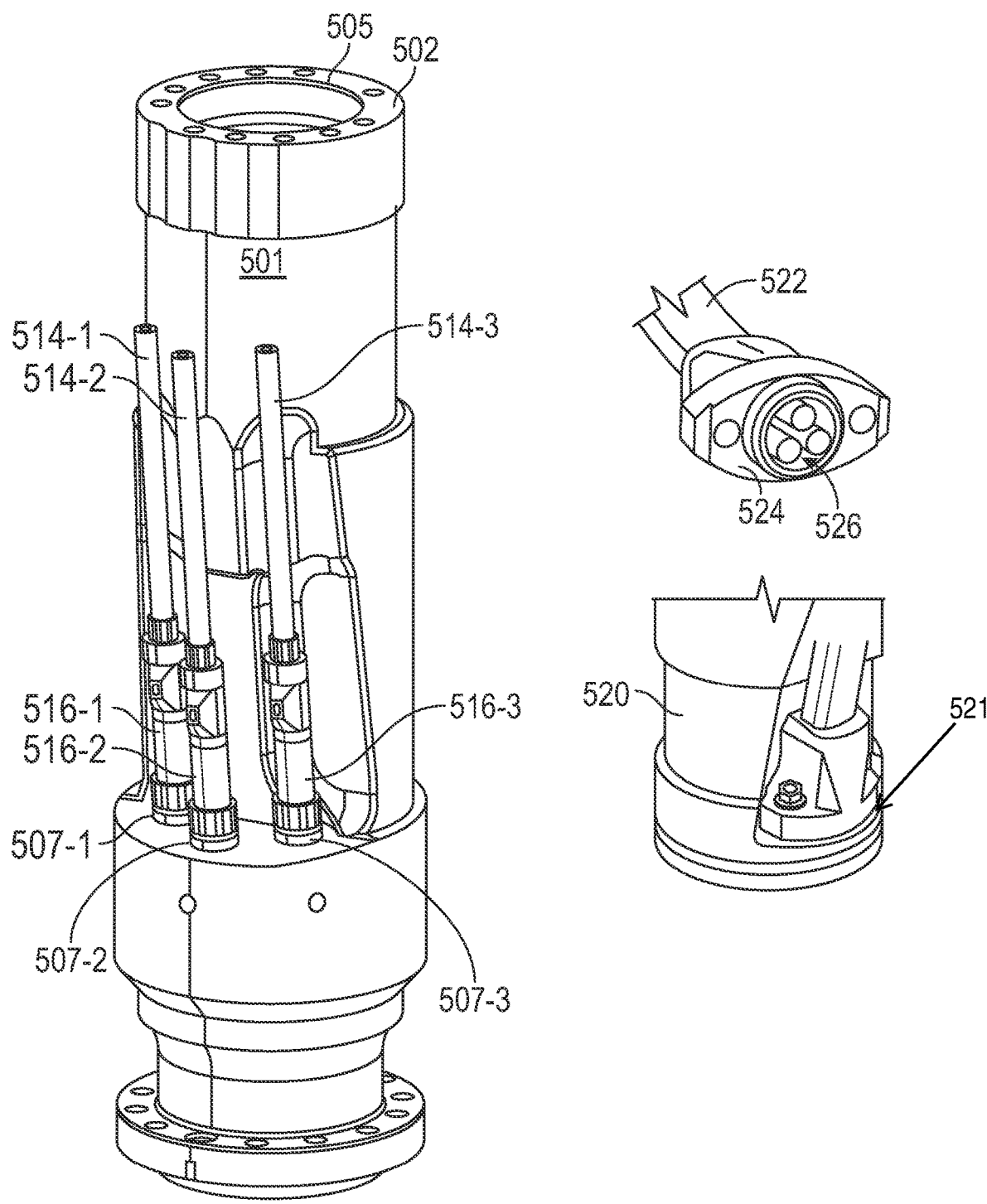
FIG. 2 shows an example pothead unit.

FIG. 2 shows an example pothead unit 501. The illustrated pothead 501 includes opposing ends 502 and 504 and a through bore, for example, defined by a bore wall 505. As shown, the ends 502 and 504 may include flanges configured for connection to other units (e.g., a protector unit at the end 502 and a motor unit at the end 504). The pothead unit 501 includes cable passages 507-1, 507-2 and 507-3 (e.g., potholes or cable connector sockets) configured for receipt of cable connectors 516-1, 516-2 and 516-3 of respective cables 514-1, 514-2 and 514-3. As an example, the cables 514-1, 514-2 and 514-3 and/or the cable connectors 516-1, 516-2 and 516-3 may include one or more polymeric materials. For example, a cable may include polymeric insulation while a cable connector may include polymeric insulation, a polymeric component (e.g., a bushing), etc.

The insulation of the cable(s) 514 and/or connector(s) 516 can be or include a structural dielectric material, for example, based on poly aryl ether ketone (PAEK) chemistries, such as Victrex PEK, PEEK, PEKEKK polymers, Solvay Ketaspire materials, GreeneTweed Arlon materials, or Evonik Vestakeep PAEK materials. The PAEK polymers can be or include virgin (unfilled) material, or may incorporate dielectric fillers, such as glass, silica, alumina, boron nitride, and/or others, to improve mechanical properties at temperature and/or to improve heat dissipation at temperature. The PAEK material can be crosslinked via thermal, chemical, or radiation methods to improve the high temperature structural stability of the material. For lower temperature applications, other sufficiently rigid dielectric materials could be used, such as filled or unfilled polysulfides (Ryton), FEP, PFA, or others.

As an example, the cables 514-1, 514-2 and 514-3 may be coupled to a single larger cable. The single larger cable may extend to a connector end for connection to a power source or, for example, equipment intermediate the cable and a power source (e.g., an electrical filter unit, etc.). As an example, a power source may be a VSD unit that provides three-phase power for operation of a motor.

FIG. 2 also shows a pothead unit 520 that includes a triad configuration socket or pothole 521. As an example, a cable 522 may include a plug 524 that can couple to the socket 521 of the pothead unit 520. In such an example, the cable 522 may include one or more conductors 526. As an example, a cable may include at least one fiber optic cable or one or more other types of cables. As an example, a fiber optic cable can include a layer of polymeric material where a barrier layer may be disposed over the layer of polymeric material. In such an example, the barrier layer may help to protect the layer of polymeric material from one or more constituents in an environment. As an example, a fiber optic cable may be suitable for use in a fluid environment where the fiber optic cable is a submersible fiber optic cable.

Equipment may be placed in a geologic environment where such equipment may be subject to conditions associated with function or functions of the equipment and/or be subject to conditions associated with the geologic environment. Equipment may experience conditions that are persistent (e.g., relatively constant), transient or a combination of both. As an example, to enhance equipment integrity (e.g., reduction in failures, increased performance, longevity, etc.), equipment may include at least one polymeric material and at least one barrier layer disposed about at least one of the at least one polymeric material.

Figure 3:
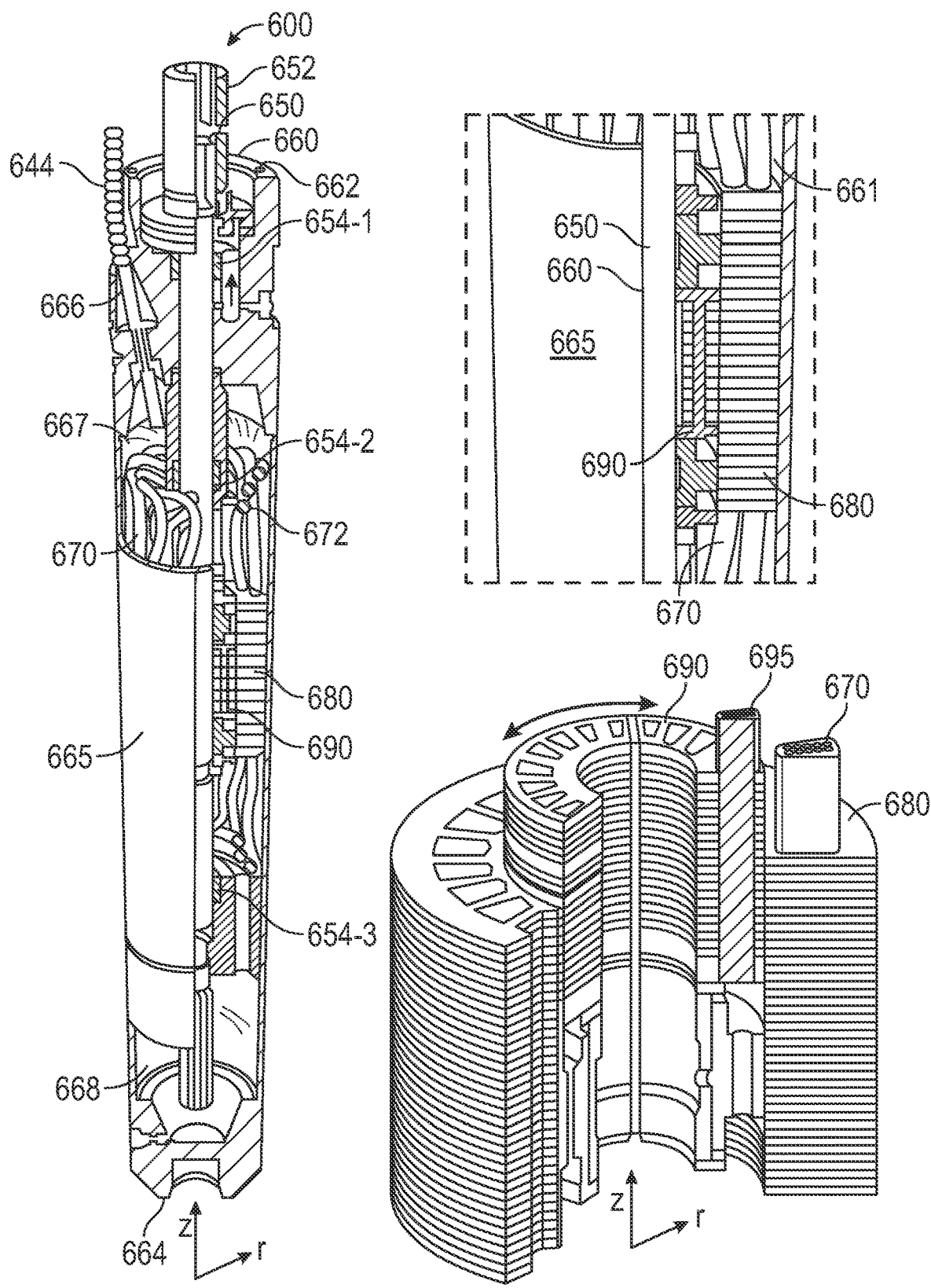
FIG. 3 shows a perspective cut-away view of an example of a motor assembly.

FIG. 3 shows a perspective cut-away view of an example motor assembly 600. As shown, the motor assembly 600 can include a power cable 644 (e.g., MLEs, etc.) to supply energy, a shaft 650, a housing 660 that may be made of multiple components (e.g., multiple units joined to form the housing 660), stacked laminations 680, stator windings 670 of wire (e.g., magnet wire), and rotor laminations 690 and rotor windings 695 coupled to the shaft 650 (e.g., rotatably driven by energizing the stator windings 670).

As shown in FIG. 3, the housing 660 includes an inner surface 661 and an outer surface 665. The housing 660 can define one or more cavities via its inner surface 661. One or more of the cavities may be hermetically sealed. Such a cavity may be filled at least partially with dielectric oil. The dielectric oil may be formulated to have a desired viscosity and/or viscoelastic properties, etc.

As shown, the shaft 650 may be fitted with a coupling 652 to couple the shaft to another shaft. A coupling may include, for example, splines that engage splines of one or more shafts. The shaft 650 may be supported by bearings 654-1, 654-2, 654-3, etc. disposed in the housing 660. The shaft may be reciprocating, for example, where a shaft includes one or more magnets (e.g., permanent magnets) that respond to current that passes through stator windings.

As shown, the housing 660 includes opposing axial ends 662 and 664 with the substantially cylindrical outer surface 665 extending therebetween. The outer surface 665 can include one or more sealable openings for passage of oil (e.g., dielectric oil), for example, to lubricate the bearings and to protect various components of the motor assembly 600. In some configurations, the motor assembly 600 may include one or more sealable cavities. For example, a passage 666 allows for passage of one or more conductors of the cable 644 (e.g., or cables) to a motor cavity 667 of the motor assembly 600 where the motor cavity 667 may be a sealable cavity. As shown, the motor cavity 667 houses the stator windings 670 and the stator laminations 680. In some configurations, an individual winding may include a plurality of conductors (e.g., magnet wires). For example, a cross-section 672 of an individual winding may reveal a plurality of conductors that are disposed in a matrix (e.g., of material or materials) or otherwise bound together (e.g., by a material or materials). In the example of FIG. 3, the motor housing 660 includes an oil reservoir 668, for example, that may include one or more passages (e.g., a sealable external passage and a passage to the motor cavity 667) for passage of oil.

In some configurations, a polymeric matrix may be formed of organic and/or inorganic monomeric and/or polymeric materials. For example, one or more of an epoxy, bismaleimide, polybutadiene, benzoxazine, cyanate ester, silicone, Ring-Opening Metathesis Polymers (ROMP), and preceramic polymers may be utilized. One or more monomers and/or polymers may be amphiphilic, which may facilitate blending in one or more fillers. For example, the functionalized linseed oil marketed as DILULIN™ material (Cargill, Inc., Wayzata, Minnesota) is amphiphilic and can allow for increasing content of one or more inorganic fillers of a composite material. Where DILULIN™ material is mentioned, a functionalized linseed oil other than that marketed as DILULIN™ may optionally be utilized.

In some configurations, a polymeric material can be thermally conductive and electrically insulative and be utilized to encapsulate windings of an electric motor. Such an approach may provide for lower winding temperatures and end coil temperatures through heat dissipation.

An electric motor may include a coil retention system such as, for example, a full winding encapsulation type, a varnished windings type, or an end coil retention type (e.g., one that does not support wires in slots). In some configurations, a glass-fiber tape can be included in a coil retention system where, for example, the glass-fiber tape is wrapped around end turns and where the glass-fiber tape is impregnated with a crosslinking resin.

An encapsulation technique can depend on the type of coil retention system employed. For example, the use of a thermosetting polymer can depend on the type of coil retention system. An encapsulated system can involve use of one or more materials and one or more particular processes. As an example, a varnished windings approach can include use of a solvent-based polybutadiene system, which tends to be more elastomeric than structural. An end coil retention resin can be a silica-filled epoxy, which has suitable structural properties due in part to the fact that the end coil retention provides coil stabilization while holding the end turns and while not supporting wires in the slots.

To maintain mechanical robustness of magnet wire wrapped in a stator of an electric motor, insulated motor windings may use a coil retention system where at least ends of coils are held in place by a structural composite that includes fibrous reinforcement (e.g., one or more of glass, quartz, aramid, etc.) and an organic and/or inorganic polymer matrix.

Dielectric fluids (e.g., motor oils, etc.) can include, for example, one or more of purified mineral oils, polyalphaolefin (PAO) synthetic oils, PFPE (polyperfluoroether), etc. Such dielectric fluids can be relatively resistant to well fluid(s), which can thereby allow an electric motor to function in case of leakage well fluid.

Figure 4:
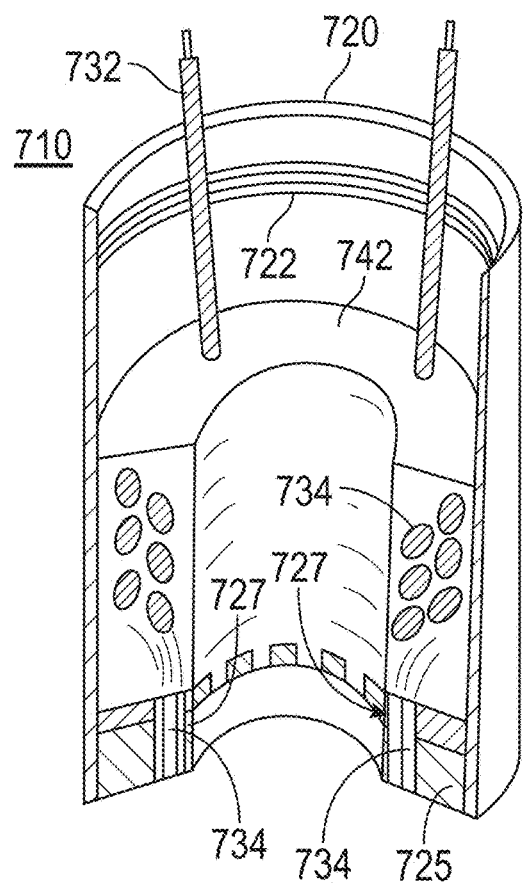
FIG. 4 shows an example electric motor.

As shown in FIG. 4, an electric motor 710 includes a housing 720 with threads 722. Lead wires (e.g., brush wires) 732 are shown where a number of such wires can correspond to a number of phases. For example, for a three phase electric motor, there can be three lead wires 732 (e.g., two being shown in the cutaway view). The lead wires 732 can be associated with a top or uphole end of an electric motor; whereas, at a bottom or downhole end, a wye point may exist where phases are electrically coupled. As an example, a wye point may be electrically coupled to one or more other components such as, for example, a gauge (e.g., a sensor unit, etc.).

As shown in the example of FIG. 4, the lead wires 732 are electrically coupled to phase windings or phase coils 734 in the end turns area. In the end turns area, the windings or coils 734 can extend or be coiled generally circumferentially. The windings or coils 734 can extend from the end turns axially downward through slots 727 in stator laminations 725. As shown in the example of FIG. 4, a polymeric material 742, which may optionally be a polymeric composite material (e.g., polymeric material that includes one or more fillers), contacts the ends of the windings or coils 734. In other words, the polymeric material 742 can surround or encapsulate the windings or coils 734 in the end turns area. A portion of the polymeric material 742 can extend downwardly through the slots 727 in the laminations 725.

In the example of FIG. 4, a molding insert may be utilized to contain the polymeric material 742 (e.g. encapsulant material) during curing of the polymeric material (e.g., where reactions occur involving at least in part monomers, etc.).

In some configurations, a method can include an injection process for injecting the polymeric material 742 into a cavity of the housing 720 to contact ends of windings or coils 734 (e.g., of magnet wire), a molding process for molding the polymeric material 742 about the ends of the windings or coils in a manner to not interfere with other components of an electric motor (e.g., to create a shaft space and/or rotor space, etc.), an assembly process for assembling an electric motor 710 that includes the stator disposed in the housing 720, an assembly process for assembly of a downhole tool that can utilize the electric motor 710 (e.g., an ESP, etc.), or any one or combination of the aforementioned processes.

Figures 5, 6:
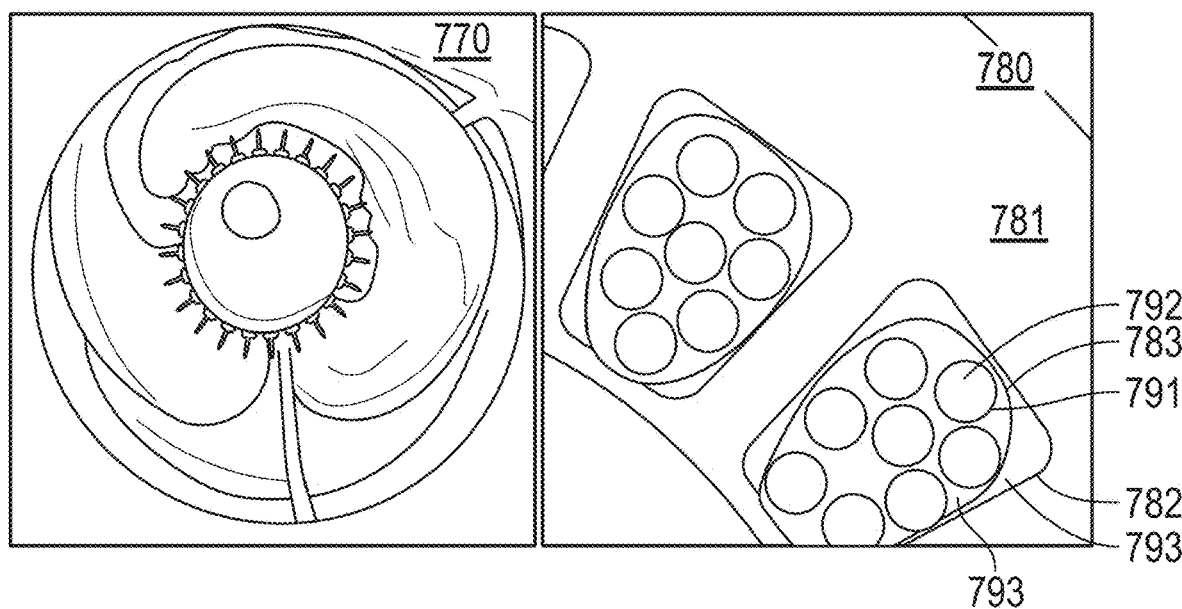
FIG. 5 shows a photograph of a portion of an electric motor.
FIG. 6 shows a portion of an electric motor.

FIG. 5 shows a photograph 770 of a portion of an electric motor where resin is applied to glass fabric for the lower portion of the windings shown in the photograph 770 (e.g., upper portion shows the glass fabric without the resin). As an example, windings can be held in place by a polymeric material (e.g., optionally a polymeric composite material) that completely encapsulates end turns and that fills slots. In such an example, air voids may be substantially removed through use of vacuum impregnation and degassing while prepolymer is heated to a low viscosity prior to gelation.

Thermally conductive encapsulants can improve reliability of ESP systems by decreasing motor winding temperatures. Applications can include SAGD, subsea, geothermal, etc. Such materials may be suitable for use in equipment for drilling and measurement operations (e.g., D&M).

FIG. 6 shows a photograph 780 of an example of a portion of a product (e.g., a portion of an example of a stator). In particular, the photograph 780 shows a lamination 781 that includes a slot 782 where slot liner material 783 defines an interior space such that the slot liner material 783 surrounds magnet wire 792 that includes insulation 791. As shown in the photograph 780, polymeric material 793, which may be polymeric composite material, is disposed exteriorly and interiorly with respect to the slot liner material 783. In some configurations, the insulation 791 can be of the order of about 0.1 mm to about 0.3 mm. The slot liner material 783 can be a polymeric film that may be of one or more layers where a layer of the film may be of the order of about 0.1 mm to about 0.3 mm. As shown, the polymeric material 793 can at least partially fill spaces defined by the slot 782 of the lamination 781. In some configurations, an individual plate may be formed of carbon steel with an oxide coating, and a plurality of such plates can be stacked to form the laminations.

As an example, heat energy generated during operation of an electric motor that includes the stator of the photograph 780 may be transferred to the polymeric material 793. For example, current in the magnet wire 792 can generate heat due at least in part to resistance of the magnet wire 792. As the polymeric material 793 is in contact with the magnet wire 792 (e.g., via the electrical insulation 791) it can conduct at least a portion of the heat energy away from the magnet wire 792, noting that resistance of the magnet wire 792 may depend on temperature (e.g., consider a wire where resistance increases with temperature or, in other words, where the wire becomes less efficient as temperature increases).

ESPs for geothermal or other high power and high temperature applications have particularly demanding requirements, e.g., high bottom hole temperature, hot water, high voltage/amperage, and high reliability requirements. High power and high temperature applications require larger brush wires 732 (e.g., AWG #1 conductors) due to higher amperage, and the wires may have thicker insulation. For example, an ESP motor for geothermal, or other high temperature, use can include insulated, solid conductor lead wires. The lead wires 732 can include solid copper conductors. The insulation of the lead wires 732 can be or include a structural dielectric material, for example, based on poly aryl ether ketone (PAEK) chemistries, such as Victrex PEK, PEEK, PEKEKK polymers, Solvay Ketaspire materials, GreeneTweed Arlon materials, or Evonik Vestakeep PAEK materials. The PAEK polymers can be or include virgin (unfilled) material, or may incorporate dielectric fillers, such as glass, silica, alumina, boron nitride, and/or others, to improve mechanical properties at temperature and/or to improve heat dissipation at temperature. The PAEK material can be crosslinked via thermal, chemical, or radiation methods to improve the high temperature structural stability of the material. For lower temperature applications, other sufficiently rigid dielectric materials could be used, such as filled or unfilled polysulfides (Ryton), FEP, PFA, or others.

Such rigid, insulated, solid conductor lead wires 732 can be stiff and difficult to bend and adjust, which can complicate assembly, such as assembly of terminals and the motor head. In such demanding applications, the magnet wires also require better heat transfer to remain cooler during operation. The magnet wires are therefore often encapsulated.

As shown in FIGS. 3-4, the magnet wires 670, 734 extend generally circumferentially at the top or uphole end of the stator. The lead wires 732 extend generally axially toward the motor head. The magnet wires 734, 670 and lead wires 732 therefore must be joined at an approximately 90 degree angle, which can be difficult with stiff lead wires 732. A conventional splice also requires additional length of wire and additional axial space, which in turn can require additional encapsulant material to fill, particularly for improved heat transfer in high power and high temperature applications.

The present disclosure provides a terminal assembly for coupling the lead wires 732 to the magnet wires or windings 734, 670, 792. The terminal assembly includes an elbow terminal to allow for improved ease of assembly. The elbow terminal advantageously requires less axial space than a conventional splice (for example, the elbow terminal can save about 6-7" of axial space) and therefore also saves encapsulant material.

Figure 7:
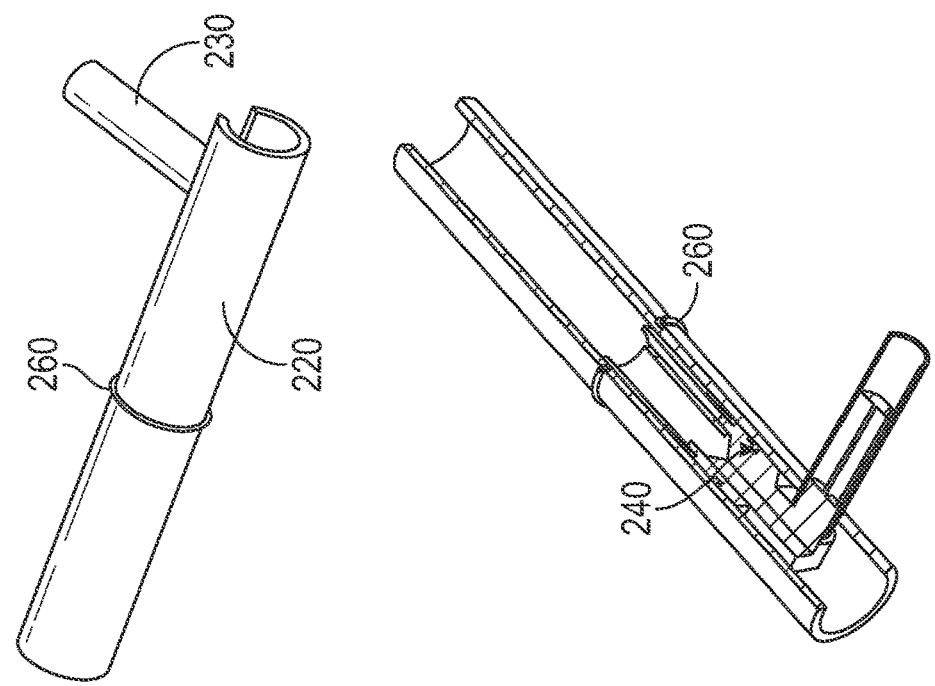
FIG. 7 shows an example terminal assembly according to the present disclosure.
Figure 7:
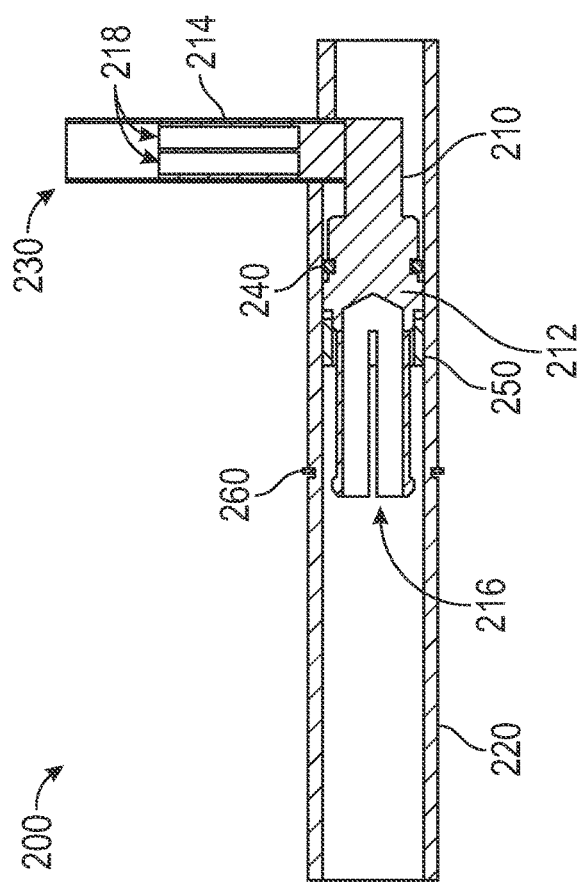

As shown in FIG. 7, the terminal assembly 200 can include an elbow terminal 210, an insulating tube 220, a splice insulation guard 230, an o-ring 240, a terminal nut 250, and/or a snap ring 260.

Figure 9B:
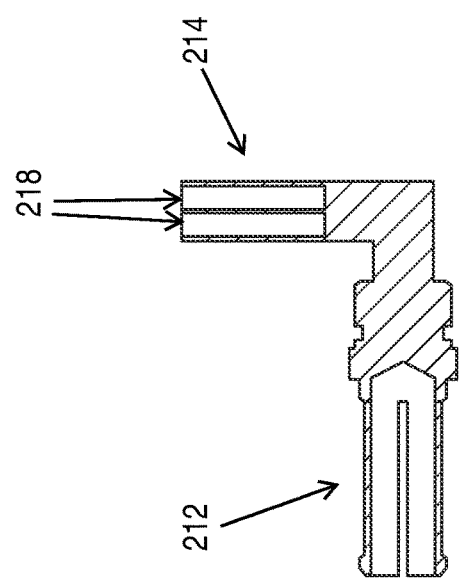
FIGS. 9A-9D illustrate an elbow terminal of the terminal assembly of FIG. 7.
Figure 9D:
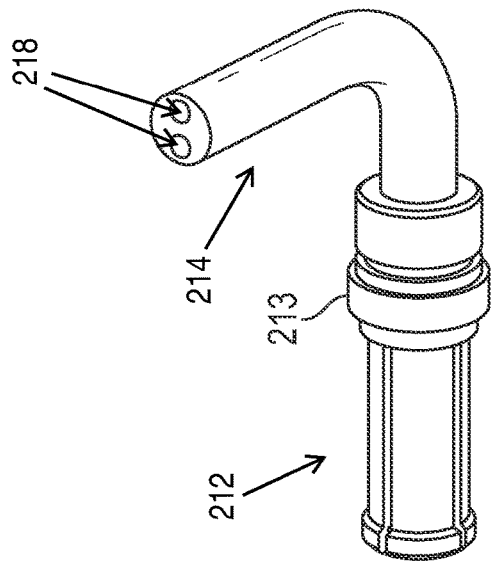
Figure 9A:
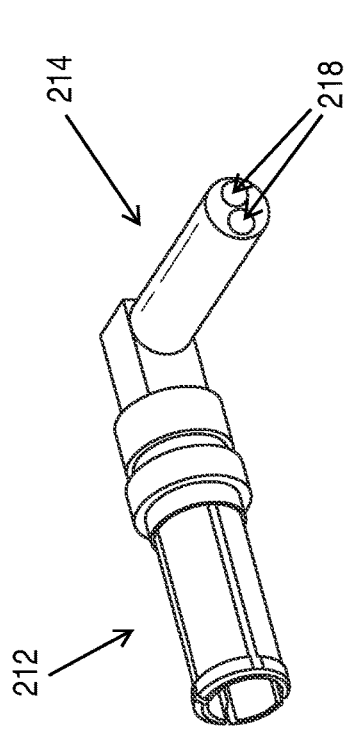
Figure 9C:
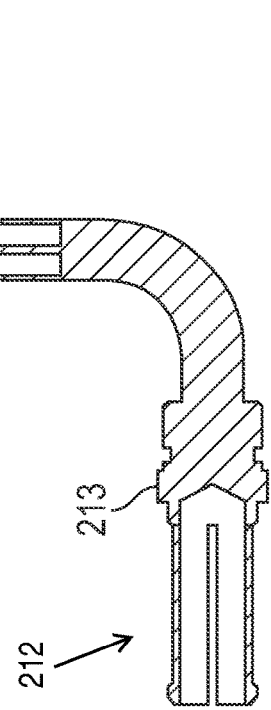

The elbow terminal 210, also shown in FIGS. 9A-9D, can include or be made of copper, and can be a machined part. The elbow terminal 210 is generally L-shaped. As shown, one arm 212 of the elbow terminal 210 is disposed and extends within the insulating tube 220. The other arm 214 of the elbow terminal 210 projects radially outward from and out of the insulating tube 220. In the illustrated configuration, the arms 212, 214 are positioned at a 90 degree angle to each other. The elbow terminal 210 can have an angular profile, as shown in FIG. 9A-9B, or a curved profile, as shown in FIG. 9C-9D. In other words, a joint or connection area between the arms 212, 214 can be angular (e.g., form a corner) or curved. The smooth transition of the bent or curved profile can advantageously allow the elbow terminal 210 to be wrapped with insulating tape and the splice guard tube 230.

Arm 212 of the elbow terminal 210 is or includes a female terminal or connection 216 configured to receive and/or connect with a lead wire 732. The other arm 214 is configured to be spliced with magnet wire 734. As shown, the arm 214 can include one or more pre-drilled holes 218 configured to ease splicing and save time. Each brush wire 732 can couple to multiple magnet wires 734, so the arm 214 can include a plurality of holes 218 to receive a plurality of magnet wires 734. In the illustrated configuration, the arm 214 includes two pre-drilled holes 218 to receive two wires 734. Either or both arms 212, 214 can have or allow for crimped joints with the lead wire 732 or magnet wire 734, respectively. The splice insulation guard 230 can be made of or include PTFE. The splice guard 230 can be a shrink wrapped tube. The splice insulation guard 230 can be disposed at or on an end of the arm 214 of the elbow terminal 210 projecting outward from the insulating tube 220. The splice guard 230 covers the splice region and can be disposed inside the encapsulation 742.

The o-ring 240 can be designed for high temperature sealing. As shown, the o-ring 240 can be disposed radially between the insulating tube 220 and the arm 212 of the elbow terminal 210 extending within the insulating tube 220. The o-ring 240 can therefore help form a seal between the elbow terminal 210 and the insulating tube 220 and prevent or inhibit escape of encapsulant material.

The terminal nut 250 helps secure the elbow terminal 210 in the insulating tube 220. As shown, the terminal nut 250 can be disposed about the arm 212 of the elbow terminal 210 within the insulating tube 220, such that the terminal nut 250 is at least partially disposed radially between the elbow terminal 210 and the insulating tube 220. In the illustrated configuration, the terminal nut 250 is positioned closer to the free end of the arm 212 within the insulating tube 220 than the o-ring 240, which is positioned closer to the arm 214 projecting out of the insulating tube 220. In the illustrated configuration, the terminal nut 250 is disposed about a base of a portion of the arm 212 forming or defining the female terminal or connection 216.

The snap ring 260 helps secure the assembly 200 in encapsulation tooling when the encapsulant is being poured. As shown, the snap ring 260 can be disposed about an outer circumference or perimeter of the insulating tube 220.

Figure 10:
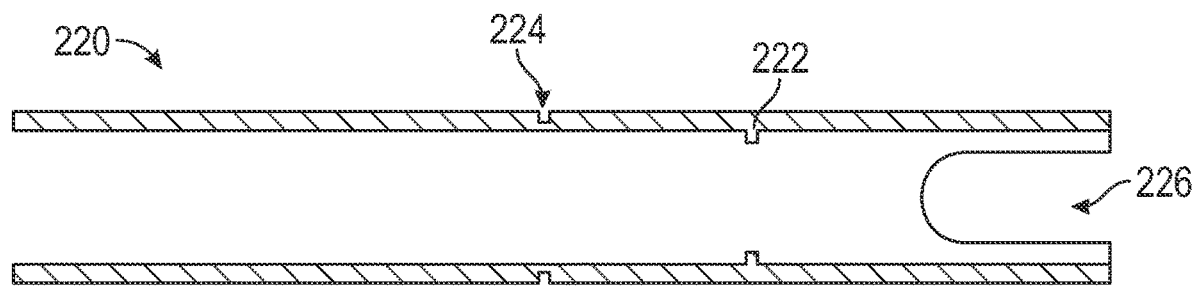
FIG. 10 illustrates an insulating tube of the terminal assembly of FIG. 7.

The insulating tube 220, also shown in FIG. 10, can be molded. The insulating tube 220 can be made of or include a structural dielectric material, for example, based on poly aryl ether ketone (PAEK) chemistries, such as Victrex PEK, PEEK, PEKEKK polymers, Solvay Ketaspire materials, GreeneTweed Arlon materials, or Evonik Vestakeep PAEK materials. The PAEK polymers can be or include virgin (unfilled) material, or may incorporate dielectric fillers, such as glass, silica, alumina, boron nitride, and/or others, to improve mechanical properties at temperature and/or to improve heat dissipation at temperature. The PAEK material can be crosslinked via thermal, chemical, or radiation methods to improve the high temperature structural stability of the material. For lower temperature applications, other sufficiently rigid dielectric materials could be used, such as filled or unfilled polysulfides (Ryton), FEP, PFA, or others.

The insulating tube 220 can include an internal step, ledge, or shoulder 222. When assembled, a corresponding shoulder 213 (shown in FIGS. 9C and 9D) of arm 212 of the elbow terminal 210 can land against one side of the step 222, and the terminal nut 250 can land against the opposite side of the step 222. The outer circumference or perimeter of the insulating tube 220 can include a groove or channel 224 configured to at least partially receive the snap ring 260. An end of the insulating tube 220 also includes a slot 226, e.g., a U-shaped slot extending partially about the circumference of the tube 220 and partially along the axial length of the tube 220, to allow for exit of the elbow terminal, i.e., to allow the arm 214 of the elbow terminal 210 to project out of the insulating tube 220.

The terminal assembly 200 advantageously reduces splicing complexity. The terminal 210 is a pre-drilled component (e.g., with holes 218) that can be easily handled and joined with the magnet wire 734, 670, 792. This advantageously reduces the time and effort needed for assembly and splicing.

Figure 8A:
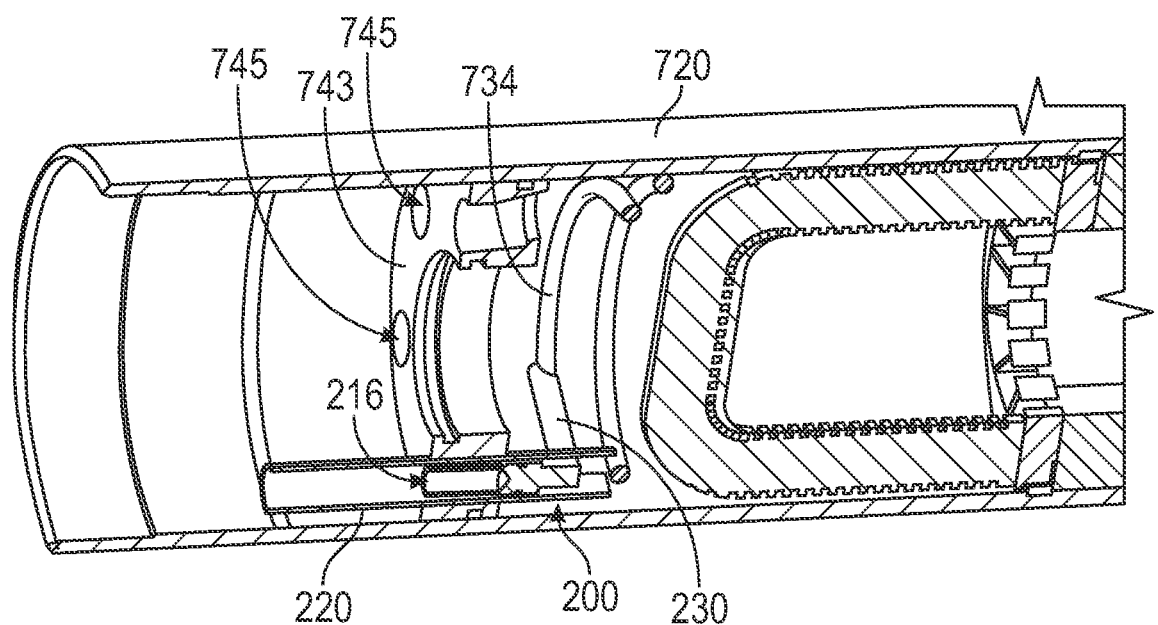
FIG. 8A shows a partial longitudinal cross-section of a stator including the terminal assembly of FIG. 7.
Figure 8B:
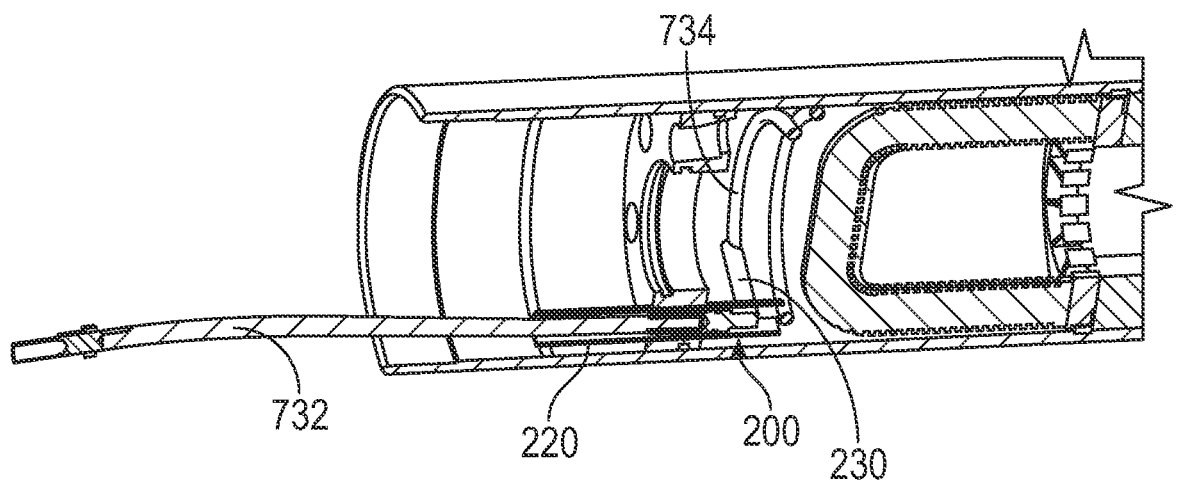
FIG. 8B shows the view of FIG. 8A including a brush wire coupled to the terminal assembly.

FIGS. 8A-8B illustrate the terminal assembly 200 disposed in a stator of an electric motor 710. In the illustrated configuration, a cap 743 or encapsulation tooling is disposed within the stator housing 720 above (or uphole of) the circumferential magnet wire 734 coils above the laminations 680. The cap 743 can include a plurality of holes 745 extending axially therethrough, for example, a hole 745 for each lead wire 732 and, in some configurations, a hole 745 for introducing encapsulant material into the stator. In the illustrated configuration, the terminal assembly 200 is positioned such that the insulating tube 220 extends axially through one of the holes 745 in the cap 743. A free end of one of the magnet wires 734 is disposed in the arm 214 of the elbow terminal 210 projecting out of the insulating tube 220. One of the lead wires 732 is disposed in the insulating tube 220 and the other arm 212 of the elbow terminal 210 within the insulation tube 220, as shown in FIG. 8B. The stator can include a terminal assembly 200 for each lead wire 732.

In some configurations, the assembly 200 is embedded (e.g., partially or entirely embedded) in encapsulation material 742, providing a completely enclosed reliable electrical connection with improved heat conduction to the housing.

Figure 11A:
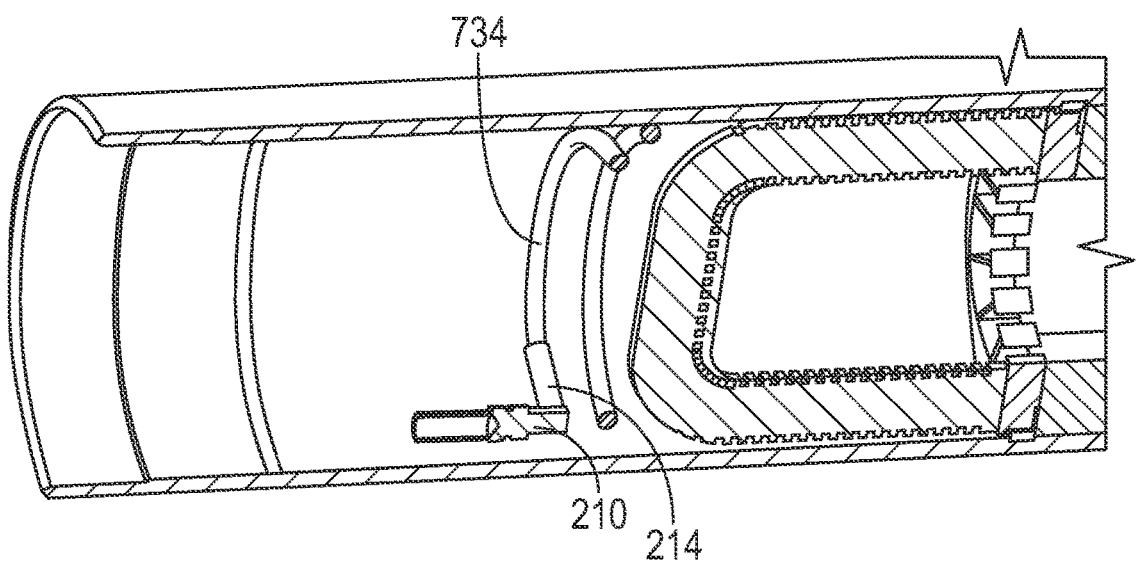
FIGS. 11A-11C illustrate a method of assembly of the terminal assembly of FIG. 7 with a stator.
Figure 11B:
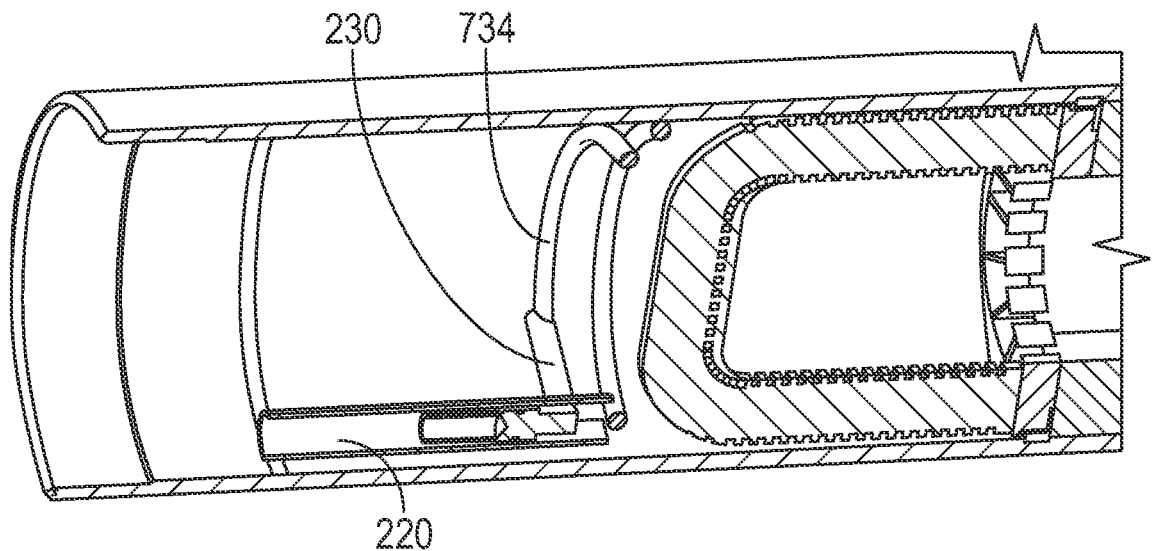
Figure 11C:
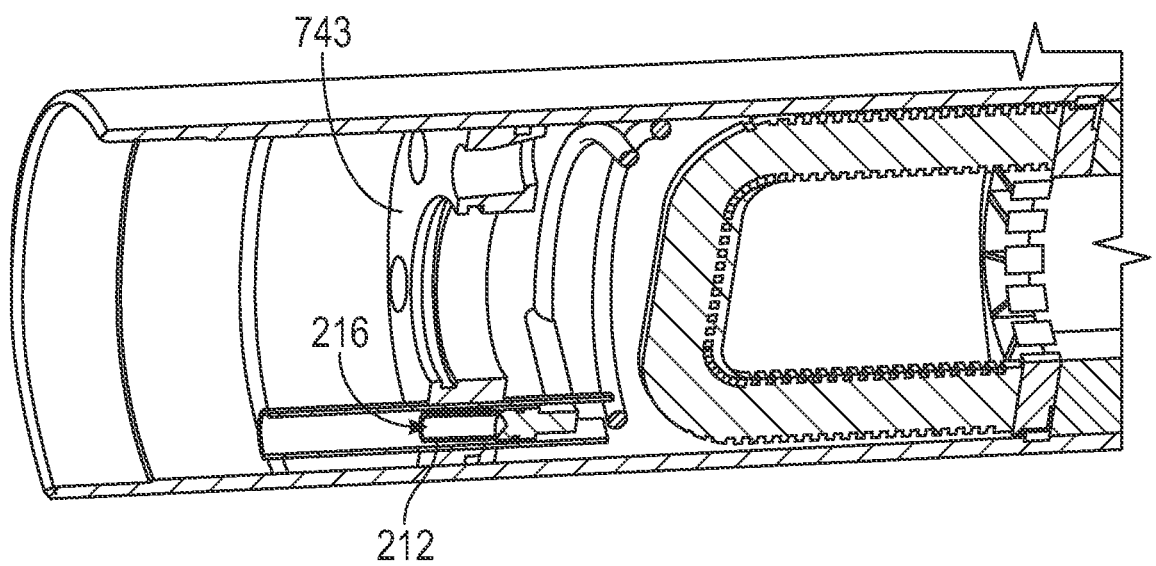

FIGS. 11A-11C illustrate a method of assembly of the assembly 200 with the stator. As shown in FIG. 11A, a magnet wire 734 is coupled to arm 214 of the elbow terminal 210 (e.g., into a hole 218), for example, via a conventional soldering or crimping process. The joint can be covered with multiple layers of insulation tape. The splice guard tube 230 is pulled over the terminal joint. The terminal 210 is then secured inside the insulating tube 220, with the o-ring 240 and terminal nut 250 in place, as shown in FIG. 11B. The terminal assembly 200 is assembled with the encapsulation tooling 743, for example with the help of the snap ring 260, as shown in FIG. 11C. Encapsulant is then poured in to encapsulate the stator and magnet wires 734. A brush wire 732 can then be coupled to arm 212 of the elbow terminal 210, for example, terminal 216, as shown in FIG. 8B.

An upper or uphole end of the lead wire 732 (opposite the end of the lead wire 732 coupled to the magnet wire 734, e.g., via assembly 200) is coupled to the motor head. As discussed herein, ESP motors for geothermal, or other high temperature, use can include insulated solid conductor lead wires. Such lead wires can be stiff and difficult to bend and adjust. Due to the stiffness of the lead wires, it can be difficult to adjust the length of the lead wire protruding from the stator by bending and compression. Therefore, the insulated solid conductor lead wires should be pre-measured and cut to the specific desired length before assembly, such that there is little to no compression of the wires once the motor head is assembled. However, such precise measurement and cutting are often not feasible in actual use, and the resulting length of the cut wire will likely be longer or shorter than needed or desired. If the wires are cut too short, it is not possible to obtain additional length due to the windings being permanent sealed in the encapsulant material within the encapsulated stator.

The present disclosure provides a terminal assembly that allows for a greater freedom of lead wire length adjustment and advantageously improves ease of assembly. FIGS. 12-16 show an example terminal assembly 300 according to the present disclosure. As shown, the terminal assembly 300 includes a terminal 310 (also shown in FIG. 14), an insulation tube 320, and a sleeve 330 (also shown in FIG. 15), e.g., made of or including PEEK or another appropriate material.

The insulation tube 320 can be made of or include a structural dielectric material, for example, based on poly aryl ether ketone (PAEK) chemistries, such as Victrex PEK, PEEK, PEKEKK polymers, Solvay Ketaspire materials, GreeneTweed Arlon materials, or Evonik Vestakeep PAEK materials. The PAEK polymers can be or include virgin (unfilled) material, or may incorporate dielectric fillers, such as glass, silica, alumina, boron nitride, and/or others, to improve mechanical properties at temperature and/or to improve heat dissipation at temperature. The PAEK material can be crosslinked via thermal, chemical, or radiation methods to improve the high temperature structural stability of the material. For lower temperature applications, other sufficiently rigid dielectric materials could be used, such as filled or unfilled polysulfides (Ryton), FEP, PFA, or others.

Figure 12:
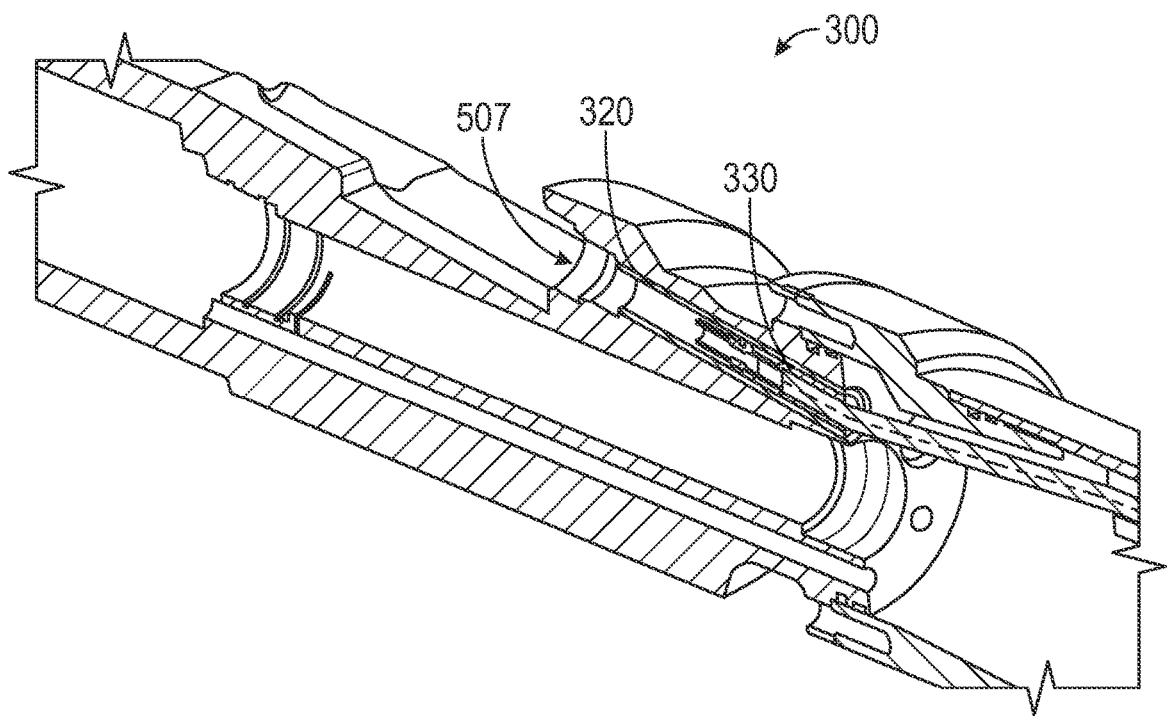
FIG. 12 shows a perspective longitudinal cross-section view of a stator coupled to a motor head including a terminal assembly.
Figure 13:
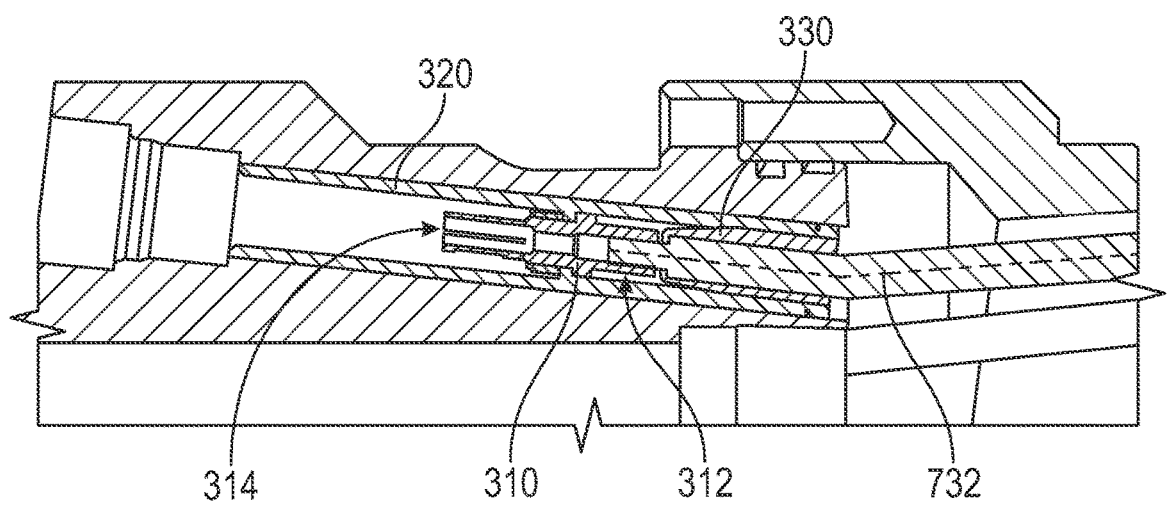
FIG. 13 shows a longitudinal cross-sectional view of a portion of FIG. 12, showing the terminal assembly.
Figure 14:
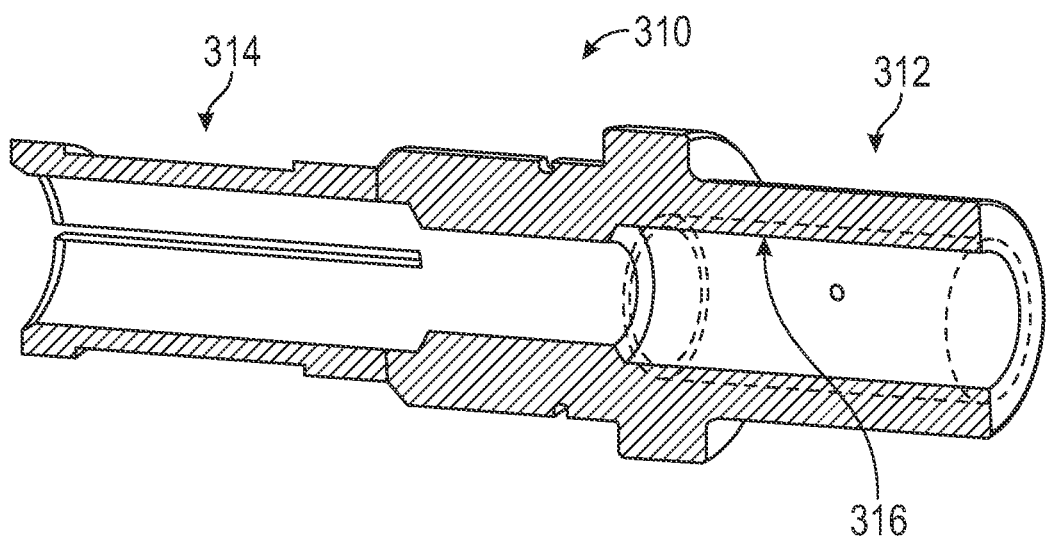
FIG. 14 shows a terminal of the terminal assembly of FIGS. 12-13.

The insulation tube 320 is disposed in the motor head pothole 507, as shown in FIG. 12. The terminal 310 is disposed within the insulation tube 320. The insulation tube 320 can include an internal step, ledge, or shoulder 322 (shown in FIG. 16). When assembled, a corresponding shoulder 313 of the terminal 310 can land against one side of the step 322. An end 312 of the terminal 310 configured to receive a lead wire 732 includes internal threads 316, for example as indicated schematically in FIG. 14. The opposite end 314 of the terminal 310 can be configured to receive a male terminal of the pothead connector. The shoulder 313 of the terminal 310 can be disposed along the body of the terminal 310 axially between end 312 and end 314.

During assembly, the insulated solid conductor lead wire(s) 732 (e.g., solid conductor insulated wires) protruding from the top or uphole end of the stator are bent into an angle following or corresponding to the slant profile of the motor head pothole 507 and inserted into the insulation tube 320 in the pothole 507. For example, the lead wire 732 can be inserted into the terminal 310, then the lead wire 732 and terminal 310 can be inserted into the insulation tube 320 in the pothole 507. The internal threads 316 of the terminal 310 allow the terminal assembly 300 to adjust for or accommodate varying lengths of the protruding lead wire 732. The wire 732 can be screwed into or out of the terminal 310 as needed. The motor head can include a terminal assembly 300 for each lead wire 732. Once adjusted to the correct length, the terminals 310 are crimped onto the solid conductor or lead wires 732.

Figure 15:
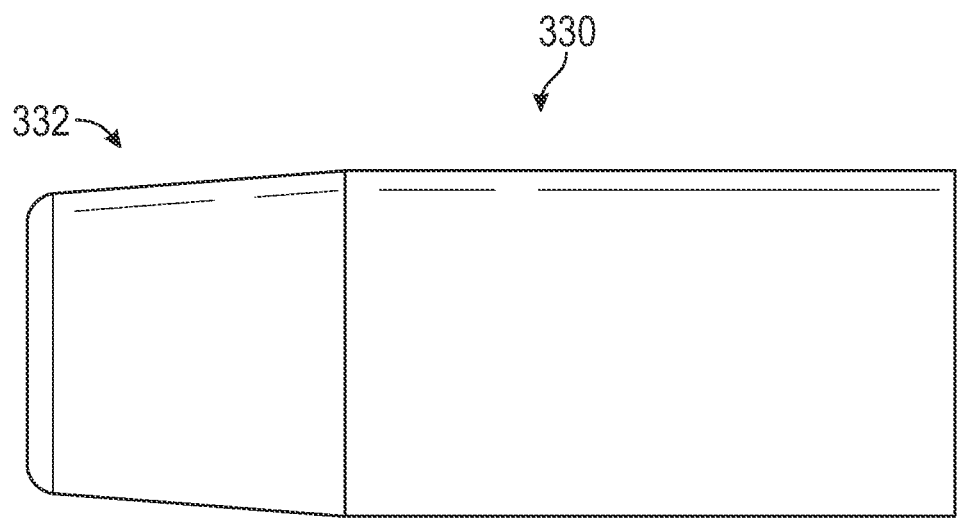
FIG. 15 shows a centralizing sleeve of the terminal assembly of FIGS. 12-13.
Figure 16:
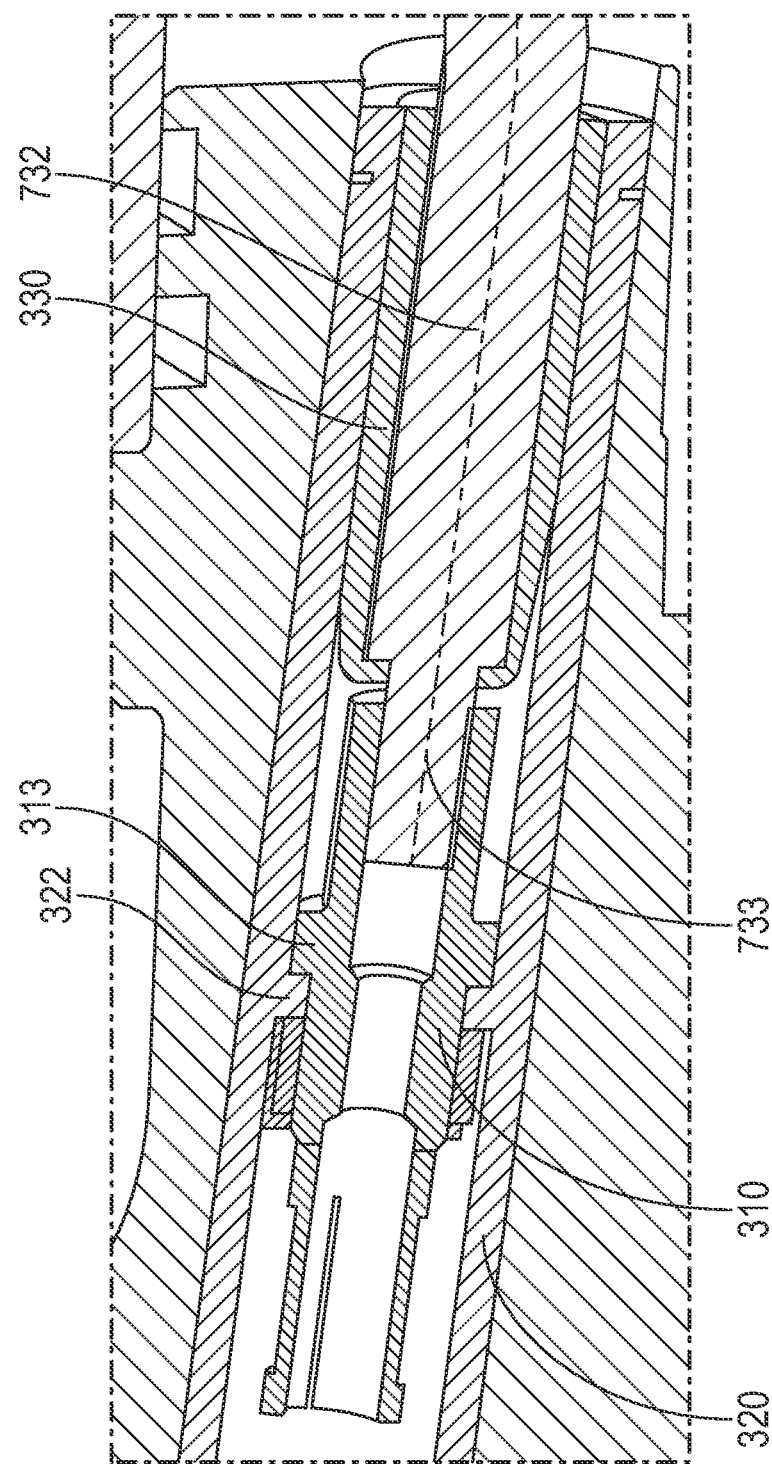
FIG. 16 shows a close-up longitudinal cross-sectional view of the terminal assembly of FIGS. 12-13 disposed in the motor head.

The sleeve 330 centralizes the wire 732 in the insulation tube 320. In some configurations, the sleeve 330 is made of or includes PEEK or another structural dielectric material as described herein. During assembly, as the terminal 310 and/or wire 732 are inserted into the insulation tube 320, the terminal 310 and/or wire 732 may not be centrally aligned in the insulation tube 320. Tilting may result in tilted connectors, which can cause improper compression on the wire. The sleeve 330 can be disposed about a portion of the wire 732. As shown in FIG. 16, the wire 732 can extend through the sleeve 330 such that an end portion 733 of the wire 732 protrudes from the sleeve 330 to be inserted into the terminal 310. When assembled, the sleeve 330 is disposed and helps fill space radially between the wire 732 and the insulation tube 320. The sleeve 330 therefore helps centralize the terminal 310 and wire 732 at the center of the insulation tube 320 to help avoid such problems. As shown in FIG. 15, a leading or uphole end or portion 332 of the sleeve 330 can have an elongated and flat chamfer, which can advantageously help self-alignment during motor head assembly.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A terminal assembly for a stator, the terminal assembly comprising:
    an elbow terminal comprising a first arm and a second arm disposed at 90 degrees relative to the first arm, the first arm configured to be connected to a lead wire and the second arm configured to be connected to a magnet wire; and
    an insulating tube, wherein the first arm of the elbow terminal extends within the insulating tube and the second arm of the elbow terminal protrudes from the insulating tube;
    wherein the terminal assembly further comprises at least one of:
    a terminal nut disposed radially between the first arm and an inner surface of the insulating tube, wherein the terminal nut is configured to secure the elbow terminal within the insulating tube; or
    a snap ring disposed on an outer surface of the insulating tube, wherein the snap ring is configured to secure the terminal assembly in an encapsulation tooling.

2. The terminal assembly of claim 1, further comprising an o-ring disposed radially between the first arm and an inner surface of the insulating tube.

3. The terminal assembly of claim 1, comprising at least the terminal nut.

4. The terminal assembly of claim 1, comprising at least the snap ring.

5. The terminal assembly of claim 1, the insulating tube comprising a structural dielectric material based on poly aryl ether ketone chemistry.

6. The terminal assembly of claim 1, wherein the terminal assembly comprises:
    a first connection receptacle disposed along a first connection axis of the first arm, wherein the first connection receptacle is configured to receive the lead wire; and
    a second connection receptacle disposed along a second connection axis of the second arm, wherein the second connection receptacle is configured to receive the magnet wire;
    wherein the first connection axis and the second connection axis are angled at 90 degrees relative to one another.

7. A method of assembling a terminal assembly for a stator, the terminal assembly comprising an elbow terminal, the method comprising:
    providing the elbow terminal comprising a first arm and a second arm disposed at 90 degrees relative to the first arm, the first arm configured to be connected to a lead wire and the second arm configured to be connected to a magnet wire;
    disposing an insulating tube about the first arm of the elbow terminal, wherein the first arm of the elbow terminal extends within the insulating tube and the second arm of the elbow terminal protrudes from the insulating tube; and
    wherein the method further comprises at least one of:
    securing the elbow terminal within the insulating tube via a terminal nut of the terminal assembly, wherein the terminal nut is disposed radially between the first arm and an inner surface of the insulating tube; or
    securing the terminal assembly in an encapsulation tooling via a snap ring of the terminal assembly, wherein the snap ring is disposed on an outer surface of the insulating tube.

8. The method of claim 6, further comprising securing the insulating tube in the encapsulation tooling via the snap ring of the terminal assembly; pouring encapsulant material through the encapsulation tooling into the stator; connecting the lead wire to the first arm of the elbow terminal; and connecting the magnet wire to the second arm of the elbow terminal.

9. The method of claim 7, comprising disposing, in the insulating tube, a structural dielectric material based on poly aryl ether ketone chemistry.

10. The method of claim 7, comprising pouring an encapsulant material through the encapsulation tooling into the stator, wherein the encapsulant material is configured to secure the connection between the magnet wire and the second arm of the elbow terminal.

11. The method of claim 7, wherein the method comprises at least securing the elbow terminal within the insulating tube via the terminal nut of the terminal assembly, wherein the terminal nut is disposed radially between the first arm and the inner surface of the insulating tube.

12. The method of claim 7, wherein the method comprises at least securing the terminal assembly in the encapsulation tooling via the snap ring of the terminal assembly, wherein the snap ring is disposed on the outer surface of the insulating tube.

13. A stator for an electric submersible pump motor, the stator comprising:
    a housing;
    a plurality of laminations forming a lamination stack within the housing;
    slots extending axially through the lamination stack;
    windings extending axially through the slots;
    an end turn area at a top end of the lamination stack in which the windings extend generally circumferentially;
    encapsulation material surrounding the windings in the end turn area;
    a plurality of lead wires coupled to the windings and extending upward from the end turn area, each lead wire of the plurality of lead wires comprising:
    a solid copper conductor; and
    insulation extruded about the conductor, the insulation comprising a structural dielectric material; and
    a stator terminal assembly coupling each lead wire of the plurality of lead wires to one or more magnet wires of the windings, the stator terminal assembly comprising:
    an elbow terminal comprising a first arm and a second arm disposed at 90 degrees relative to the first arm, the first arm configured to be connected to the lead wire and the second arm configured to be connected to the one or more magnet wires; and
    an insulating tube, wherein the first arm of the elbow terminal extends within the insulating tube and the second arm of the elbow terminal protrudes from the insulating tube;
    wherein the stator terminal assembly comprises at least one of:
    a terminal nut disposed radially between the first arm and an inner surface of the insulating tube, wherein the terminal nut is configured to secure the elbow terminal within the insulating tube; or a snap ring disposed on an outer surface of the insulating tube, wherein the snap ring is configured to secure the stator terminal assembly in an encapsulation tooling.

14. An electric submersible pump motor comprising:
the stator of claim 13; and
a motor head comprising at least one pothole configured to receive a cable connector coupled to a cable.

15. The motor of claim 14, further comprising the cable connector and the cable, wherein the cable comprises a structural dielectric material based on poly aryl ether ketone chemistry.

16. The motor of claim 14, further comprising a motor head terminal assembly disposed in the at least one pothole, the motor head terminal assembly comprising:
an additional insulation tube; and
a terminal disposed within the additional insulation tube, a first end of the terminal configured to receive the lead wire extending from the stator of the electric submersible pump.

17. The motor of claim 16, the first end of the terminal comprising internal threads configured to allow for accommodation of varying lengths of the lead wire extending from the stator.

18. The motor of claim 16, wherein an opposite second end of the terminal is configured to receive a male terminal of the cable connector.

19. The stator of claim 13, wherein the stator terminal assembly comprises at least the terminal nut.

20. The stator of claim 13, wherein the stator terminal assembly comprising comprises at least the snap ring.

* * * * *